United States Patent
Lee et al.

(10) Patent No.: US 8,130,524 B2
(45) Date of Patent: Mar. 6, 2012

(54) BI-DIRECTIONAL DC TO DC POWER CONVERTER HAVING A NEUTRAL TERMINAL

(75) Inventors: Yi-Hu Lee, Kaohsiung (TW); Wen Hsu, Kaohsiung (TW); Chin-Chang Wu, Kaohsiung (TW); Hung-Liang Chou, Kaohsiung (TW); Ya-Tsung Feng, Kaohsiung (TW)

(73) Assignee: Ablerex Electronics Co., Ltd., Taipei Hsien (TW)

( * ) Notice: Subject to any disclaimer, the term of this patent is extended or adjusted under 35 U.S.C. 154(b) by 196 days.

(21) Appl. No.: 12/458,288

(22) Filed: Jul. 8, 2009

(65) Prior Publication Data
US 2010/0072819 A1 Mar. 25, 2010

(30) Foreign Application Priority Data
Sep. 22, 2008 (TW) .............................. 97136247 A

(51) Int. Cl.
*H02M 7/5387* (2007.01)
*H02M 3/156* (2006.01)
*G05F 1/577* (2006.01)

(52) U.S. Cl. ........ 363/132; 323/267; 323/271; 323/282; 363/98

(58) Field of Classification Search .................. 323/222, 323/267, 271, 282; 363/34, 37, 98, 124, 363/132
See application file for complete search history.

(56) References Cited

U.S. PATENT DOCUMENTS

| | | | | |
|---|---|---|---|---|
| 5,345,375 A * | 9/1994 | Mohan | ............................ | 363/40 |
| 5,383,109 A * | 1/1995 | Maksimovic et al. | ........ | 323/222 |
| 6,154,380 A * | 11/2000 | Assow et al. | .................... | 363/61 |
| 6,281,595 B1 * | 8/2001 | Sinha et al. | ................. | 290/40 A |
| 6,295,215 B1 * | 9/2001 | Faria et al. | ...................... | 363/37 |
| 6,914,349 B2 * | 7/2005 | Rajagopalan | ................... | 307/65 |
| 2004/0155526 A1 * | 8/2004 | Naden et al. | .................... | 307/43 |

* cited by examiner

*Primary Examiner* — Adolf Berhane
*Assistant Examiner* — Fred E Finch, III
(74) *Attorney, Agent, or Firm* — Bacon & Thomas, PLLC

(57) ABSTRACT

A bi-directional DC to DC power converter includes two DC sources, two inductors respectively connected to the two DC sources, a first switch and a second switch respectively connected to the two inductors, two capacitors respectively connected to the two switches, and a third switch connected between the two inductors. The first, second and third switches are respectively connected reversely with a diode in parallel. When the third switch is alternately turned on and off and the first and second switches are always turned off, the power converter operates as a boost power converter and electric energy flows from the two DC sources to the two capacitors. When the third switch is always turned off and the first and second switches are synchronously turned on or off, the power converter operates as a buck power converter and electric energy flows from the two capacitors to the two DC sources.

16 Claims, 5 Drawing Sheets

BI-DIRECTIONAL DC TO DC POWER CONVERTER HAVING A NEUTRAL TERMINAL

BACKGROUND OF THE INVENTION

1. Field of the Invention

The present invention is related to a bi-directional DC to DC power converter having a neutral terminal. More particularly, the bi-directional DC to DC power converter having the neutral terminal can be operated in a boost mode or a buck mode to allow a bi-directional electric energy transmission.

2. Description of Related Art

A DC to DC boost/buck power converter with a neutral terminal is often used in power related apparatus. Taking the uninterruptible power supply (UPS) system as an example, a DC to DC boost power converter with a neutral terminal is used to step up an input DC voltage having a neutral terminal to produce an output DC voltage having a neutral terminal with a required level. The output DC voltage having a neutral terminal can be applied to other subsequent devices.

With reference to FIG. 1, U.S. Pat. No. 6,154,380 discloses a conventional boost power converter being composed of an AC power source (U), a full-wave bridge rectifier (100), two inductors (L1, L2), a switch (T1), two diodes (101, 102), two capacitors (C1, C2) and a load.

Electric energy output from the bridge rectifier (100) is temporarily stored in the two inductors (L1, L2) and then transmitted to the two capacitors (C1, C2) to accomplish the voltage boost operation as the switch (T1) is alternately turned on and off. However, the conventional boost power converter has no voltage buck function and only permits the electric energy to be transmitted in one direction. For many applications, a DC to DC power converter integrated with a boost converter mode and a buck converter mode, having a neutral output terminal, and allowing energy being transmitted in two directions to meet requirements of different power systems is necessary.

For a UPS system comprising a single-phase half-bridge inverter and a three-phase four-wire inverter with a split capacitors leg, a battery module of the UPS system has to cooperate with a DC to DC boost power converter to step up voltage and supply two identical DC voltages to the two DC capacitors of the split capacitors leg via a neutral output terminal when the utility system is abnormal. On the contrary, the electric energy must be transmitted in an opposite direction through a DC to DC buck power converter to charge the battery module when the utility system is normal.

SUMMARY OF THE INVENTION

The primary objective of the present invention is to provide a bi-directional DC to DC power converter having a neutral terminal and capable of being operated selectively in a boost converter mode and a buck converter mode to allow electric energy to be transmitted in two directions. With the neutral terminal, the bi-directional DC to DC power converter can supply two identical DC voltages to meet different requirements of DC voltage conversion systems.

To achieve the objective, the bi-directional DC to DC power converter in accordance with the present invention comprises a first DC power circuit, a second DC power circuit and a third switch.

The first DC power circuit comprises a first DC source, a first inductor, a first switch and a first capacitor being connected sequentially, wherein the first DC source has a positive terminal and a negative terminal, the first inductor has two terminals respectively connected to the positive terminal of the first DC source and the first switch, and the first switch is controlled to selectively turn on or off and further connected with a first diode in parallel.

The second DC power circuit comprises a second DC source, a second inductor, a second switch and a second capacitor being connected sequentially, wherein the second DC source has a positive terminal and a negative terminal, the second inductor has two terminals respectively connected to the negative terminal of the second DC source and the second switch, and the second switch is controlled to selectively turn on or off and further connected reversely with a second diode in parallel.

The third switch has two ends with a first end connected to a node where the first inductor and the first switch are connected together, and a second end connected to another node where the second inductor and the second switch are connected together, the third switch being controlled to selectively turn on or off and further connected reversely with a third diode in parallel.

The negative terminal of the first DC source is connected to the positive terminal of the second DC source at a first node, the first capacitor and the second capacitor are connected at a second node, and the first node and the second node are connected together to form a neutral terminal.

When the third switch is controlled to alternately turn on and off and the first switch and the second switch are turned off, the bidirectional DC to DC power converter is operated as a boost power converter and electric power is transmitted from the first DC source and the second DC source to the first capacitor and the second capacitor.

When the third switch is turned off and the first switch and the second switch are synchronously turned on or off, the bi-directional DC to DC power converter is operated as a buck power converter and electric power is transmitted from the first capacitor and the second capacitor to the first DC source and the second DC source.

Another objective of the present invention is to provide a UPS system including the bi-directional DC to DC power converter as described above, wherein a DC to AC inverter is connected to the output of the bi-directional DC to DC power converter to produce a stable output AC voltage for a load.

Other objectives, advantages and novel features of the invention will become more apparent from the following detailed description when taken in conjunction with the accompanying drawings.

BRIEF DESCRIPTION OF THE DRAWINGS

The present invention will become more fully understood from the detailed description given hereinafter and the accompanying drawings which are given by way of illustration only, and thus are not limitative of the present invention, and wherein.

DETAILED DESCRIPTION OF THE PREFERRED EMBODIMENT

Figure 1:
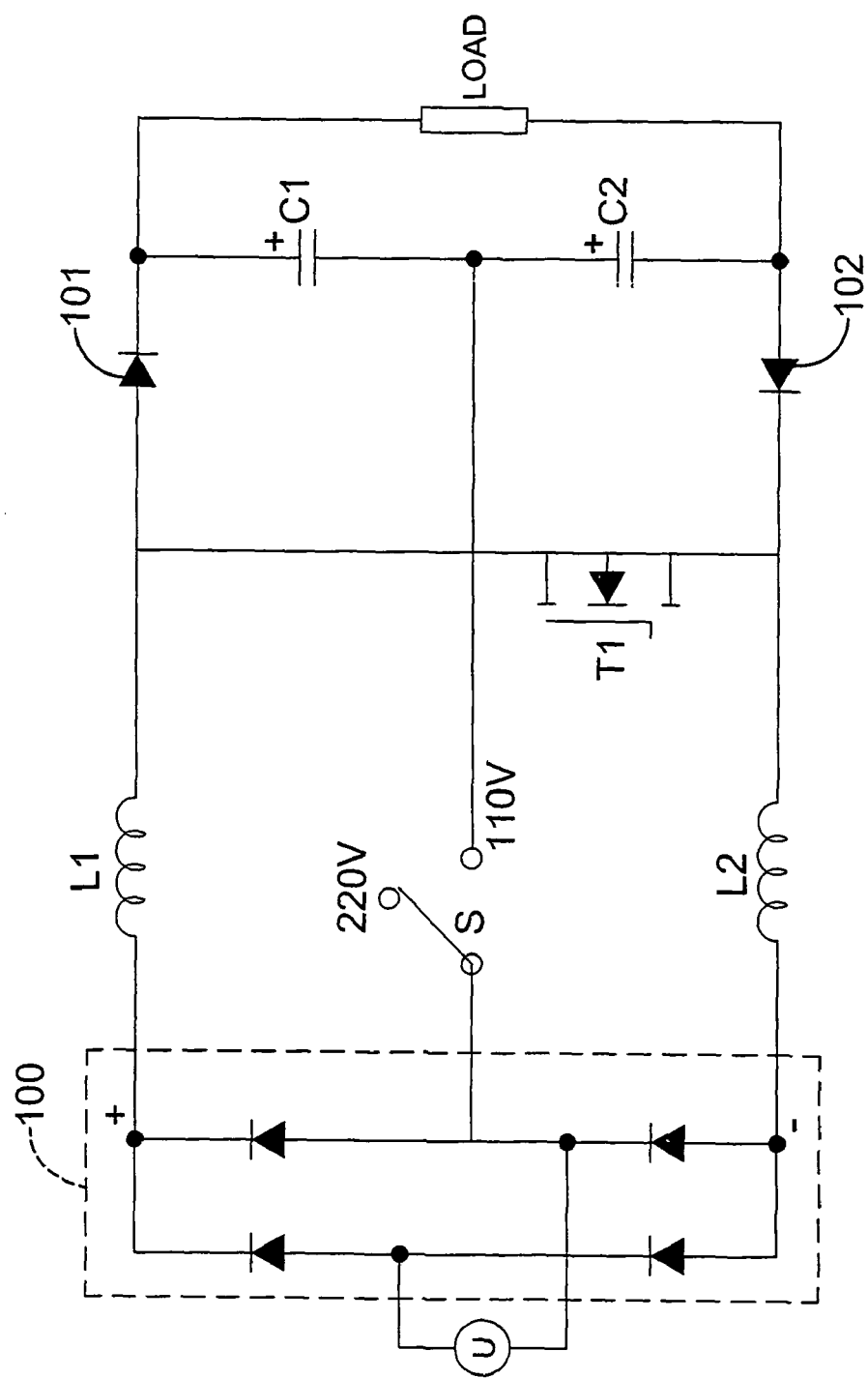
FIG. 1 is a circuit diagram of a boost power converter in accordance with prior art.
Figure 2:
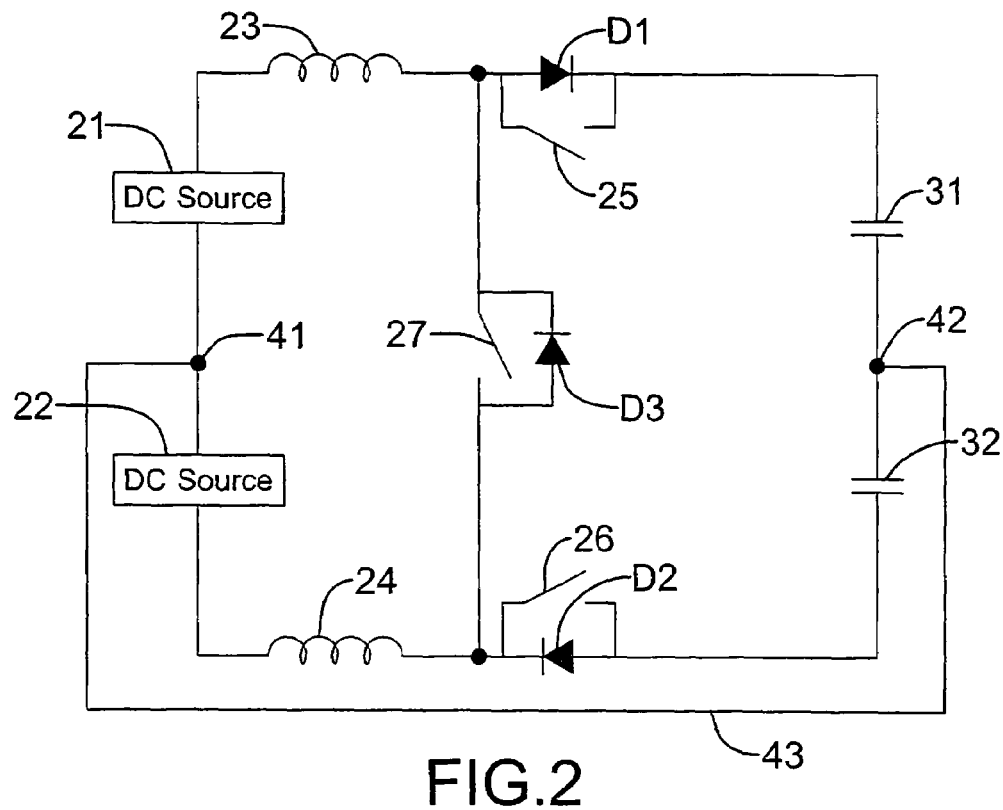
FIG. 2 is a block diagram of a bi-directional DC to DC power converter having a neutral terminal in accordance with the present invention.

With reference to FIG. 2, a bi-directional DC to DC power converter having a neutral terminal in accordance with the present invention is illustrated. The bi-directional DC to DC power converter comprises a first DC power circuit, a second DC power circuit and a third switch (27) connected between the first and the second DC power circuits.

The first DC power circuit comprises a first DC source (21), a first inductor (23), a first switch (25) and a first capacitor (31) being connected sequentially. The first DC source (21) has a positive terminal and a negative terminal. The first inductor (23) has two terminals respectively connected to the positive terminal of the first DC source (21) and the first switch (25). The first switch (25) is controlled to selectively turn on or off and further connected reversely with a first diode (D1) in parallel.

The second DC power circuit comprises a second DC source (22), a second inductor (24), a second switch (26) and a second capacitor (32) connected sequentially. The second DC source (22) has a positive terminal and a negative terminal. The second inductor (24) has two terminals respectively connected to the negative terminal of the second DC source (22) and the second switch (26). The second switch (26) is controlled to selectively turn on or off and further connected reversely with a second diode (D2) in parallel.

The third switch (27) has two ends with a first end connected to a node where the first inductor (23) and the first switch (25) are connected together, and a second end connected to another node where the second inductor (24) and the second switch (26) are connected together. The third switch (27) can be controlled to turn on or off by a control signal. The third switch (27) may be further connected reversely with a third diode (D3) in parallel.

The negative terminal of the first DC source (21) is connected to the positive terminal of the second DC source (22) at a first node (41). The first capacitor (31) and the second capacitor (32) are connected at a second node (42). The first node (41) and the second node (42) are connected together to form a neutral terminal (43), whereby the first capacitor (31) and the second capacitor (32) can supply a DC voltage with the neutral terminal (43).

Figure 3:
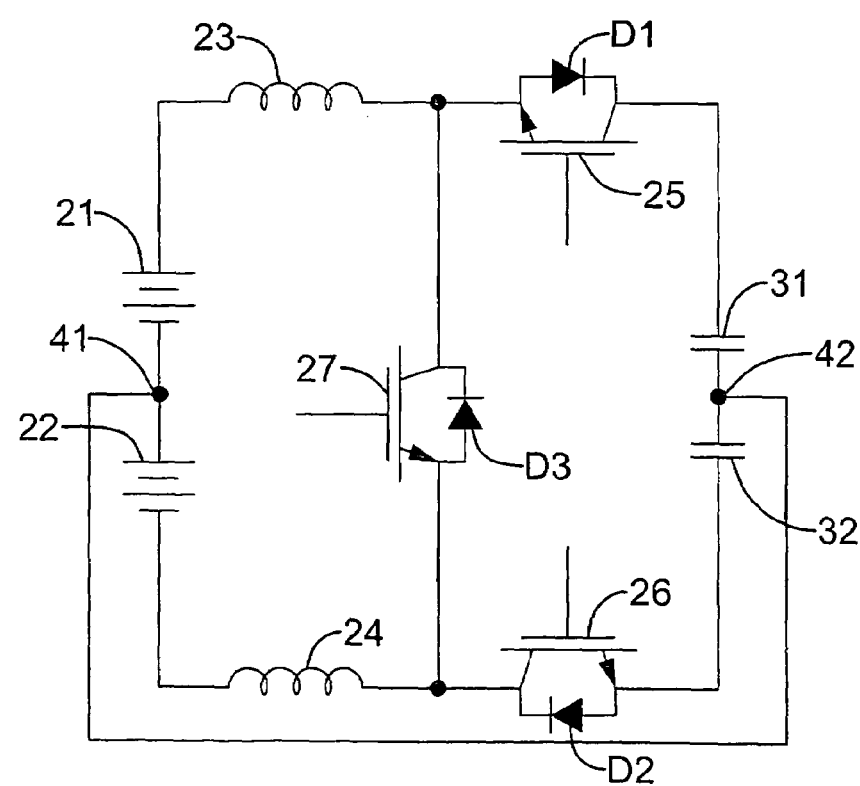
FIG. 3 is a circuit diagram of the bi-directional DC to DC power converter having a neutral terminal in accordance with the present invention.

With reference to FIG. 3, the first DC source (21) and the second DC source (22) can be a battery module, respectively. The negative terminal of one battery module is connected to the positive terminal of the other battery module, where the terminals of the two battery modules are connected together as the first node (41). The first switch (25), the second switch (26) and the third switch (27) can be power electronic switches, and each of which has a gate for receiving a control signal that turns on or off the power electronic switch.

With the foregoing circuit configuration, the present invention is able to selectively provide a boost converter mode or a buck converter mode and allows electric energy to be transmitted in two directions.

Figure 4:
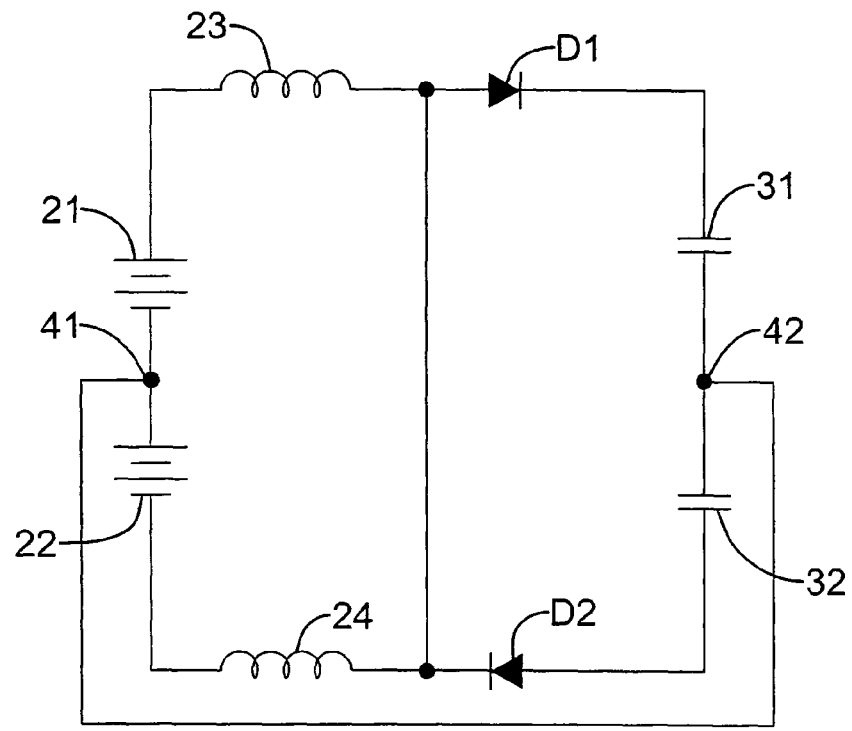
FIG. 4 illustrates the bi-directional DC to DC power converter having a neutral terminal in accordance with the present invention being operated as a boost power converter.
Figure 5:
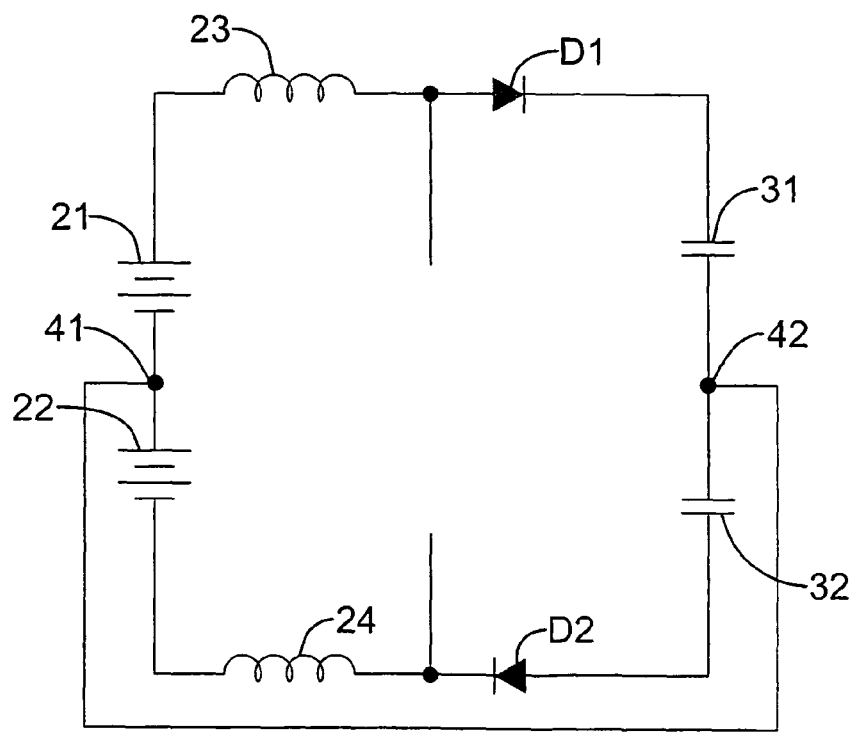
FIG. 5 illustrates the bi-directional DC to DC power converter having a neutral terminal in accordance with the present invention being operated as a buck power converter.

In the boost converter mode, the two battery modules discharge their stored electric energy. The circuit operations are described hereinafter in detail. When the third switch (27) is controlled to alternately turn on and off and both the first switch (25) and the second switch (27) are always turned off, the circuit is operated as a boost power converter to increase the DC voltage and allow electric energy being transmitted from the two DC sources (21)(22) to the two capacitors (31) (32). FIGS. 4 and 5 illustrate the circuit operations when the third switch (27) is turned on and turned off, respectively.

With reference to FIG. 4, when the third switch (27) is controlled to turn on, electric current flowing through the first inductor (23) and the second inductor (24) increases, and electric energy from the two DC sources (21)(22) will be stored in the two inductors (23)(24). With reference to FIG. 5, when the third switch (27) is controlled to turn off, electric energy from the two DC sources (21) (22) and previously stored in the two inductors (23)(24) will be released to the first capacitor (31) and the second capacitor (32) through the first diode (D1) and the second diode (D2) to produce a DC voltage with the neutral terminal. The electric current flowing through the two inductors (23)(24) thus decreases gradually.

By alternately controlling the third switch (27) to turn on and off, the purpose of voltage boost is achieved. Dividing the voltage of the two DC sources (21)(22) by (1-D) is equal to the DC voltage with the neutral terminal over the two capacitors (31)(32), where D is the duty ratio of the third switch (27). Since the duty ratio D of the third switch (27) is smaller than 1, the DC voltage with neutral terminal over the two capacitors (31)(32) will be higher than the voltage of the two DC sources (21)(22), thereby achieving voltage boost.

Contrary to the foregoing boost converter mode, the two battery modules are charged when the circuit operates as a buck power converter. While the third switch (27) is always kept in the turn-off status, the third diode (D3) still can provide a one-way path. By simultaneously turning on both the first switch (25) and the second switch (26), the electric current flowing through the two inductors (23)(24) increases. Further, electric energy output from the two capacitors (31) (32) are stored in the two inductors (23)(24) and the two DC sources (21)(22) are charged. By simultaneously turning off both the first switch (25) and the second switch (26), electric energy stored in the two inductors (23)(24) will release to the two DC sources (21)(22) through the third diode (D3), and the electric current flowing through the two inductors (23)(24) decreases gradually. In short, electric power is transmitted from the two capacitors (31)(32) to the two DC sources (21) (22) operated as a buck power converter to charge the two DC sources (21)(22). Multiplying the DC voltage of the two capacitors (31)(32) by the duty ratios of the first and second switches (25)(26) can obtain the voltage of the two DC sources (21)(22). Since the duty ratios of the two switches (25)(26) are smaller than 1, the voltage of the two DC sources (21)(22) is always lower than the voltage of the two capacitors (31)(33), thereby achieving voltage bucking.

Figure 6:
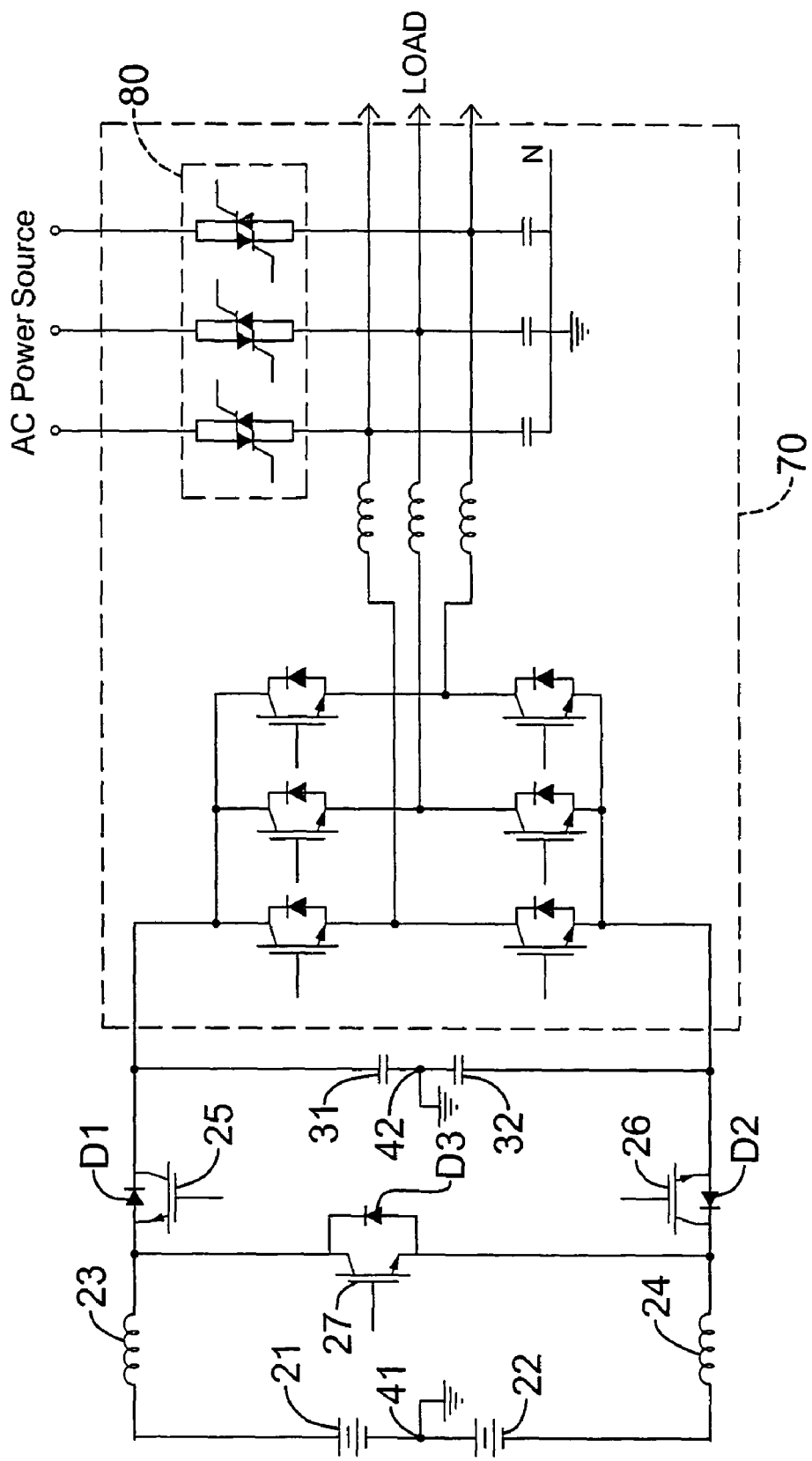
FIG. 6 illustrates the bi-directional DC to DC power converter having a neutral terminal in accordance with the present invention being applied in one UPS system.

With reference to FIG. 6, the present invention is applied in a three-phase four-wire uninterruptible power supply (UPS) system having a DC to AC inverter (70) and an AC switching set (80). The DC to AC inverter (70) is connected to the capacitors (31)(32). The DC to AC inverter (70) comprises three sets of power electronic switches configured in parallel. Each set of the power electronic switches includes two power electronic switches connected in series, wherein each power electronic switch further connects reversely a diode in parallel. Each set of the power electronic switches further connects with a filter being composed of an output inductor and an output capacitor. The output capacitors can couple to a load and connect to an AC power source through the AC switching set (80).

When the AC power source is normal, the AC switching set (80) is turned on so that the DC to AC inverter (70) converts the AC power from the AC power source to DC power and produces DC voltages over the two capacitors (31)(32). The bi-directional DC to DC power converter of the present invention is operated as a buck power converter. Hence, the two DC sources (21)(22) can be charged by the produced DC voltages of the two capacitors (31)(32). The load directly obtains the required electric energy from the AC power source. Once the AC power source fails, the AC switching set (80) separates the AC power source from the DC to AC inverter (70). The bi-directional DC to DC power converter of the present invention uses the energy stored in the two DC sources (21)(22) to produce a DC voltage with the neutral terminal on the two capacitors (31)(32). The DC to AC inverter (70) converts the DC voltage with the neutral terminal on the two capacitors (31)(32) to a three-phase four-wire AC output voltage for the load. Battery modules of the UPS system can be used as the two DC sources (21)(22) in the bi-directional DC to DC power converter. The first node (41) where the two DC sources (21)(22) connect together and the second node (42) where the two capacitors (31)(32) connect together may both connect to either a neutral wire of the AC power source or a ground wire. Since the bi-directional transmission of electric energy is available, the battery modules can be discharged to supply energy operated as a boost power converter, otherwise the battery modules can be charged by the AC power source operated as a buck power converter.

Figure 7:
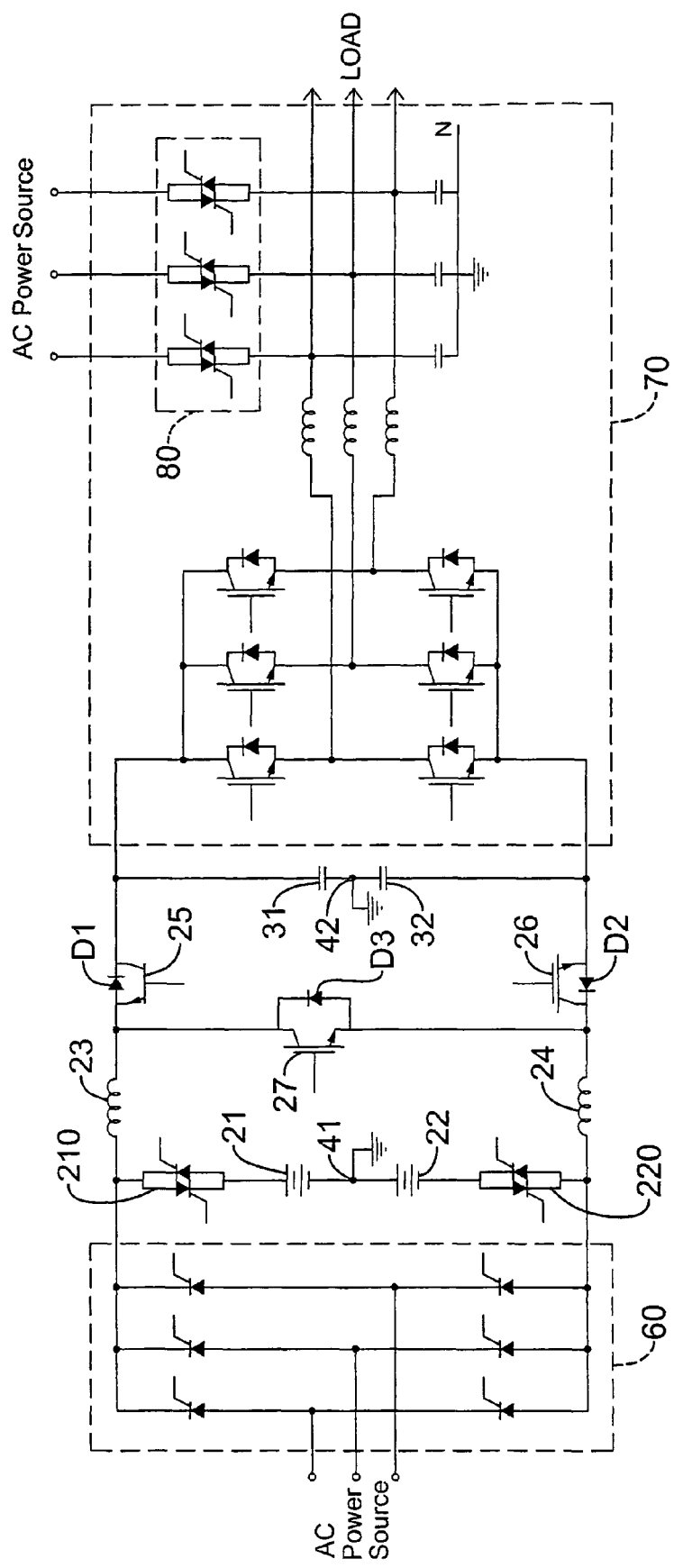
FIG. 7 illustrates the bi-directional DC to DC power converter having a neutral terminal in accordance with the present invention being applied in another UPS system.

With reference to FIG. 7, the present invention can be applied in another type of UPS system having an AC to DC converter (60), a DC to AC inverter (70) and a AC power switching set (80). The bi-directional DC to DC power converter of the present invention connects with the AC to DC converter (60) and the DC to AC inverter (70). The first DC source (21) and the second DC source (22) are further respectively connected with bi-directional switches (210)(220) in series. The AC to DC converter (60) comprises three sets of silicon-controlled rectifiers and connects to a three-phase AC power source, wherein the three sets of silicon-controlled rectifiers are connected in parallel and each set is composed of two silicon-controlled rectifiers connected in series.

When the AC power applied to the DC to AC inverter (70) is normal, the AC switching set (80) is turned on, the AC to DC converter (60) does not operate, the two bi-directional switches (210)(220) are turned on and the third switch (27) is always kept in turn-off. Therefore, the bi-directional DC to DC converter of the present invention is operated as a buck power converter to charge the first DC source (21) and the second DC source (22).

When the first DC source (21) and the second DC source (22) have been fully charged, the first switch (25) and the second switch (26) are controlled to turn off and the two bi-directional switches (210)(220) are disconnected from the first DC source (21) and the second DC source (22). After the two bi-directional switches (210)(220) are disconnected, the AC to DC converter (60) activates, the AC switching set (80) is kept in turn-on and the third switch (27) is turned off. If the AC power source generates abnormal low voltage, the AC power switching set (80) is turned off. If the effective voltage of the AC power source remains higher than a default ratio of the rated voltage of the AC power source, the AC to DC converter (60) remains operating and the two bidirectional switches (210)(220) are still kept in the turn-off status. The bi-directional DC to DC power converter of the present invention is operated as a boost power converter and the DC to AC inverter (70) is controlled to produce AC voltage for the load. In short, if the effective voltage of the AC power source is higher than the default ratio of the rated voltage of the AC power source, the first DC source (21) and the second DC source (22) do not discharge. Thus, the first DC source (21) and the second DC source (22) can prevent from being frequently charged and discharged, whereby prolonging the use life of the two DC sources (21)(22) and also lengthening a power supplying time of the UPS system in case of the abnormal low voltage of the AC power source. The default ratio of the rated voltage of the AC power source can be determined by a maximum voltage boosting ratio and efficiency of the bi-directional DC to DC power converter.

Once the AC power source is abnormal and the effective voltage of the AC power source has been lower than the default ratio of the rated voltage of the AC power source, the AC switching set (80) is turned off and the AC to DC converter (60) is deactivated. The two bi-directional switches (210)(220) are turned on so that the first DC source (21) and the second DC source (22) start to discharge. The bi-directional DC to DC power converter of the present invention is operated as a boost power converter. The DC to AC converter (70) is controlled to produce AC voltage for the load.

If the AC power source returns to normal, the DC to AC inverter (70) acts as a AC to DC converter. The AC power switching set (80) will be turned on and the AC to DC converter (60) will be deactivated, wherein both the bi-directional switches (210)(220) are turned on. The bi-directional DC to DC power converter of the present inventions is operated as a buck power converter to charge the first DC source (21) and the second DC source (22).

With the simplified configuration, the present invention provides a power converting device that is capable of achieving the voltage boost and voltage buck functions, supplying a DC voltage with a neutral point and allowing the electric energy being transmitted in two directions to meet different types of power systems.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A bi-directional DC to DC power converter comprising:
a first DC power circuit consisting of a first DC source, a first inductor, a first switch and a first capacitor being connected sequentially, wherein
the first DC source has a positive terminal and a negative terminal;
the first inductor has two terminals respectively connected to the positive terminal of the first DC source and the first switch; and
the first switch is controlled to selectively turn on or off, has a first end and a second end and is further connected reversely with a first diode in parallel;
a second DC power circuit consisting of a second DC source, a second inductor, a second switch and a second capacitor being connected sequentially, wherein
the second DC source has a positive terminal and a negative terminal;

the second inductor has two terminals respectively connected to the negative terminal of the second DC source and the second switch; and the second switch is controlled to selectively turn on or off, has a first end and a second end and is further connected reversely with a second diode in parallel; and a third switch having two ends with a first end directly connected to the first end of the first switch at which the first inductor and the first switch are connected together, and a second end directly connected to the first end of the second switch at which the second inductor and the second switch are connected together, the third switch being controlled to selectively turn on or off and further connected reversely with a third diode in parallel;

wherein the negative terminal of the first DC source is connected to the positive terminal of the second DC source at a first node, the first capacitor and the second capacitor are connected at a second node, and the first node and the second node are connected together to form a neutral terminal.

2. The bi-directional DC to DC power converter as claimed in claim 1, wherein when the third switch is controlled to alternately turn on and off and the first switch and the second switch are turned off, the bi-directional DC to DC power converter is operated as a boost power converter and electric power is transmitted from the first DC source and the second DC source to the first capacitor and the second capacitor;

when the third switch is turned off and the first switch and the second switch are synchronously turned on or off, the bi-directional DC to DC power converter is operated as a buck power converter and electric power is transmitted from the first capacitor and the second capacitor to the first DC source and the second DC source.

3. The bi-directional DC to DC power converter as claimed in claim 2, wherein when the DC to DC power converter is operated as a boost power converter, electric energy is stored in the first and the second inductors when the third switch is turned on, and electric current flowing through the first and the second inductors increases;

when the third switch is turned off, the electric energy from the first and the second DC sources and previously stored in the first and the second inductors is released to the first capacitor and the second capacitor through the first diode and the second diode to produce a DC voltage with higher level than that of the first DC source and the second DC source, the electric current flowing through the first and the second inductors decreases gradually.

4. The bi-directional DC to DC power converter as claimed in claim 3, wherein each of the first DC source and the second DC source is a battery module.

5. The bi-directional DC to DC power converter as claimed in claim 2, wherein when the DC to DC power converter is operated as a buck power converter, the electric current flowing through the first and the second inductors increases when the first and the second switches are turned on, and the first and the second DC sources are also charged;

when the first and the second switches are simultaneously turned off, the electric energy stored in the two inductors is released to the two DC sources through the third diode, and the electric current flowing through the two inductors decreases gradually.

6. The bi-directional DC to DC power converter as claimed in claim 5, wherein each of the first DC source and the second DC source is a battery module.

7. The bi-directional DC to DC power converter as claimed in claim 2, wherein each of the first DC source and the second DC source is a battery module.

8. The bi-directional DC to DC power converter as claimed in claim 1, wherein each of the first DC source and the second DC source is a battery module.

9. An uninterruptible power supply (UPS) system having a bi-directional DC to DC power converter, the UPS system comprising:

a first DC power circuit consisting of a first DC source, a first inductor, a first switch and a first capacitor being connected sequentially, wherein the first DC source has a positive terminal and a negative terminal;

the first inductor has two terminals respectively connected to the positive terminal of the first DC source and the first switch; and the first switch is controlled to selectively turn on or off, has a first end and a second end and is further connected reversely with a first diode in parallel;

a second DC power circuit consisting of a second DC source, a second inductor, a second switch and a second capacitor being connected sequentially, wherein the second DC source has a positive terminal and a negative terminal;

the second inductor has two terminals respectively connected to the negative terminal of the second DC source and the second switch; and the second switch is controlled to selectively turn on or off, has a first end and a second end and is further connected reversely with a second diode in parallel; and a third switch having two ends with a first end directly connected to the first end of the first switch where the first inductor and the first switch are connected together, and a second end directly connected to the first end of the second switch where the second inductor and the second switch are connected together, the third switch being controlled to selectively turn on or off and further connected reversely with a third diode in parallel;

a DC to AC inverter connected to the first capacitor and the second capacitor for connecting to a load, and connected to an AC power source through an AC switching set;

wherein the negative terminal of the first DC source is connected to the positive terminal of the second DC source at a first node, the first capacitor and the second capacitor are connected at a second node, and the first node and the second node are connected together to form a neutral terminal.

10. The UPS system as claimed in claim 9, wherein when the third switch is controlled to alternately turn on and off and both the first switch and the second switch are turned off, the bi-directional DC to DC power converter is operated as a boost power converter and electric power is transmitted from the first DC source and the second DC source to the first capacitor and the second capacitor;

when the third switch is turned off and the first switch and the second switch are synchronously turned on or off, the bi-directional DC to DC power converter is operated as a buck power converter and electric power is transmitted from the first capacitor and the second capacitor to the first DC source and the second DC source.

11. The UPS system as claimed in claim 10, wherein when the bi-directional DC to DC power converter is operated as the boost power converter, electric energy is stored in the first and the second inductors when the third switch is turned on, and electric current flowing through the first and the second inductors increases;

when the third switch is turned off, the electric energy from the first and the second DC sources and previously stored in the first and the second inductors is released to the first capacitor and the second capacitor through the first diode and the second diode to produce a DC voltage with higher level than that of the first DC source and the second DC source, the electric current flowing through the first and the second inductors decreases gradually.

12. The UPS system as claimed in claim 11, wherein each of the first DC source and the second DC source is a battery module.

13. The UPS system as claimed in claim 10, wherein when the bi-directional DC to DC power converter is operated as the buck power converter, the electric current flowing through the first and the second inductors increases when the first and the second switches are turned on, and the first and the second DC sources are also charged;

when the first and the second switches are simultaneously turned off, the electric energy stored in the two inductors is released to the two DC sources through the third diode, and the electric current flowing through the two inductors decreases gradually.

14. The UPS system as claimed in claim 13, wherein each of the first DC source and the second DC source is a battery module.

15. The UPS system as claimed in claim 10, wherein each of the first DC source and the second DC source is a battery module.

16. The UPS system as claimed in claim 9, wherein each of the first DC source and the second DC source is a battery module.

* * * * *